United States Patent [19]

Burris

[11] Patent Number: 4,621,108

[45] Date of Patent: Nov. 4, 1986

[54] GILSONITE-ASPHALT EMULSION COMPOSITION

[76] Inventor: Michael V. Burris, 2005 Plaza del Dios, Las Vegas, Nev. 89102

[21] Appl. No.: 744,990

[22] Filed: Jun. 17, 1985

[51] Int. Cl.$^4$ .......................... C08L 7/00; C08L 9/00; C08L 95/00; C08J 3/20

[52] U.S. Cl. ................................... 523/340; 523/351; 524/71

[58] Field of Search ................... 524/71; 523/340, 351

[56] References Cited

U.S. PATENT DOCUMENTS

| | | | |
|---|---|---|---|
| 4,094,696 | 6/1978 | Burris | 106/278 |
| 4,193,815 | 5/1980 | Burris | 106/277 |
| 4,282,037 | 8/1981 | Burris | 106/278 |
| 4,330,449 | 5/1982 | Maldonado et al. | 524/68 |
| 4,492,781 | 1/1985 | Duszak et al. | 524/71 |

FOREIGN PATENT DOCUMENTS 58-201822 11/1983 Japan ................................... 524/71

*Primary Examiner*—Allan M. Lieberman
*Attorney, Agent, or Firm*—Seiler, Quirk, & Tratos

[57] ABSTRACT

A base stock composition comprises a blend of gilsonite, asphalt and a rubber latex residue. The base stock may be used alone as a paving material or emulsified to form a gilsonite emulsion having a variety of uses.

7 Claims, No Drawings

GILSONITE-ASPHALT EMULSION COMPOSITION

BACKGROUND OF THE INVENTION

In my prior U.S. Pat. Nos. 4,094,696, 4,073,659, 4,193,815 and 4,282,037 there are disclosed gilsonite-asphalt emulsion compositions. A number of the compositions are effective for paving surfaces, and others for producing coatings, insulation board materials, etc. As useful as these materials are, skid resistance and the ability of the composition to resist deterioration over long periods of use, especially when exposed to alternating periods of extreme weather conditions, leave something to be desired. It is to still further improved gilsonite-asphalt emulsion compositions having superior paving characteristics as well as a number of other uses that the compositions of the present invention are directed.

SUMMARY OF THE INVENTION

The gilsonite-asphalt emulsion compositions of the present invention comprise a base stock consisting of a blend of gilsonite, asphalt, and a latex or rubber. Preferably the latex used is the residue after the water has been substantially removed, the base stock then being emulsified in water with an emulsifying agent.

DETAILED DESCRIPTION OF THE INVENTION

In the gilsonite-asphalt base stock composition, gilsonite and asphalt are blended in a wide range of ratios of between about 1 part gilsonite–99 parts asphalt and 95 parts gilsonite–5 parts asphalt, by weight. Preferably, gilsonite is present in amounts of at least about 5% although smaller amounts of gilsonite may be used. The specific ratios of asphalt and gilsonite present in the base stock will depend on the use and the desired properties. For example, for paving compositions, normally more than 50% of the hydrocarbon composition will be asphalt, whereas for other uses such as in wallboard, insulation, roofing, or mineral and fiber-filled coating compositions, and the like, greater amounts of gilsonite may be used. However, such ratios and percentages are only guidelines, and the specific amounts of those materials may be selected as desired within the purview of the invention.

The rubber latex material comprises rubber emulsion or latexes in which small globules or particles of natural or synthetic rubber are suspended in water with emulsifying agents. The preferred rubber is styrene-butadiene (SBR), neoprene, or natural rubber. SBR latexes normally have a major amount of rubber present. For example, a commercially available SBR material contains about 68-70% rubber and about 30% water. The SBR rubber may also be cross-linked, for example, with carboxylate groups resulting from treatment with methacrylic acid, or the like. Commercially available neoprene latexes have a solids content of about 35%, while a commercially available natural rubber latex has about 60% rubber. Other useful rubbers include nitrile, butyl, polyurethanes and silicones, and block copolymers such as styrene-isoprene (SIS) and styrene-ethylene-vinyl acetate (SEVAS). In the latexes, a small amount of emulsifying agent is present which may be cationic, nonionic or anionic. In the preferred SBR latexes, a fatty acid soap is used while in natural rubber natural proteins serve as anionic emulsifiers and stabilizers. Commercially available neoprene latex normally use nonionic emulsifiers. Thus, the specific emulsifier in the latex to be used in the gilsonite-asphalt emulsions of the present invention is not critical and will not necessarily determine the type of emulsion of the final product. The amount of latex residue used in the composition of the invention will depend on the final use of the composition, but normally between about 1 and about 50% latex based on the base stock or hydrocarbon phase, by weight, will be suitable. For most paving compositions latex amounts of up to about 10% are sufficient. Although latexes are preferred, solid rubbers may also be used, particularly in the case of block copolymers which are not commercially available as latexes. Several commercially available materials include styrene-butadiene-styrene block copolymers sold under the registered trademark Kraton thermoplastic rubber, block copolymers of styrene and butadiene sold under the registered trademark Solprene, and other elastomers sold under the registered trademarks TPR Thermoplastic Rubber and Hytrel. Such rubbers or elastomers in the form of flakes, powders or pieces, are melted into a hot asphalt-gilsonite blend at suitable temperature at or above the rubber melting point. Where asphalt is present in major amounts, i.e., above about 50% of the base stock, it may be preferable to melt the gilsonite and rubber particles in the hot asphalt to form the base stock.

The asphalt used in producing the composition is preferably a penetration grade asphalt having a penetration above about 10 and up to about 300 dmm at 77° F. (25° C.), 100 g/5 sec. The specific penetration will depend on the type of emulsion which is to be produced. For example, in producing a slurry emulsion or chip seal emulsion, penetrations will preferably be around 50–70. Although penetration or paving (AR) grade asphalts are usually preferred, liquid asphalt may also be used for certain applications, such asphalts being well known paving grade asphalts cut back with naphtha, kerosene, gas oil or other light oils preferably with high maltene contents to produce rapid curing (RC), medium curing (MC), or slow curing (SC) liquid asphalts. Air blown or oxidized asphalts may also be used.

Gilsonite is preferably one having a melting or softening point near about 300° F. so that it may be more easily softened and blended with the asphalt at such temperatures. One such gilsonite comprises a "selects" grade, having a nominal melting or softening point above 300° F., usually about 310°–320° F. However, other grades of gilsonite may be used including the "brilliant black" grade having a softening point above about 385° F.

The gilsonite and asphalt are blended at elevated temperatures, above the softening or melting point of the gilsonite. The gilsonite and asphalt are heated to a temperature above about 300° F. (300°–350° F.) and mixed until blending is completed. Where major amounts of asphalt are used, it may be preferred to heat the asphalt to at least the gilsonite melting point and then melt the gilsonite in the hot asphalt. Again, the specific ratio of the gilsonite and asphalt will depend on the use of the composition.

Once the hot asphalt and gilsonite have been thoroughly blended, the latex is mixed with the hydrocarbon blend. Where viscosity characteristics and homogeneity of the final emulsion product are important, such as in chip seal or slurry seal emulsion compositions, the method of adding the latex material to prepare the base stock is important since the latexes should not be mixed directly with a gilsonite-asphalt emulsion. If such emulsion mixtures are attempted, viscosity of the mixture will deteriorate and separation will occur yielding an unsatisfactory composition. Accordingly, to prepare such emulsions, the latexes are treated to remove substantially all of the water and the residue is then blended with the gilsonite-asphalt phase to form the base stock which is then emulsified to produce the compositions of the invention. Water may be removed from the latex by any desirable method, such as by boiling off the water. The residue, comprising substantially all of the rubber material together with the minor amount of residual emulsifying agent and other nonvolatile materials, is then mixed thoroughly with the gilsonite or asphalt phase. Alternatively, the water in the latex may be removed by carefully adding the latex to the hot gilsonite-asphalt blend which will flash off the water. Yet another alternative is to add the latex residue to the asphalt which is then blended with the hot gilsonite. Once those materials have been thoroughly mixed or blended to form the base stock, the emulsion is formed by adding the base stock to water containing a desirable amount of emulsifying agent. The ratio of the hydrocarbon blend to water will depend on the final use, normally with ratios of hydrocarbon:water phases being between about 1:2 and 3:1, respectively, by weight, although the specific amount of water is not critical.

Where the viscosity and homogeneity properties of the emulsion are not so critical or important, an emulsion composition may be prepared by simply blending a gilsonite-asphalt emulsion with a latex. Such compositions are suitable especially where fillers and/or thixotropic agents are to be added to produce the final composition. In that case, a gilsonite-asphalt emulsion is prepared as disclosed in my aforesaid patents and the latex is then added as are the fillers, etc. The compositions are mixed to produce a product emulsion wherein the amount of rubber solids are between about 1 and about 50% of the hydrocarbon blend, i.e., gilsonite and asphalt, by weight.

The final gilsonite-asphalt-latex residue emulsion may be cationic, anionic or nonionic depending on the use and as desired. For most asphalt paving uses, cationic emulsions are preferred. Suitable cationic emulsifiers include quaternary ammonium halides, amine acetate salts, and alkyl-substituted imidazolines. Specific emulsifiers within these groups and examples of such compounds as well as commercially available materials are described in my aforesaid U.S. Pat. No. 4,073,659, the full description thereof being incorporated herein by reference. Other cationic emulsifiers well known to those skilled in the art may also be used.

Anionic emulsifiers include petroleum sulfonates and sulfates, soap-type emulsifying agents, normally the alkyl metal salts of higher fatty acids, often referred to as fatty acid soaps, including lauric, myristic, palmitic, oleic, ricinoleic, linoleic acids and the like, as well as mixtures of acids available from animal or vegetable oils, well known to those skilled in the art. Other examples of anionic emulsifiers are described in my aforesaid U.S. Pat. No. 4,282,087, the description of which is incorporated herein by reference.

Nonionic emulsifying compositions include long chain polyoxyethylene, or polyoxypropylene groups in fatty acid, alcohol, amide or amine molecules. These surface active agents do not ionize but acquire their hydrophilic characteristics from oxygenated side chains such as the polyoxyethylene or polyoxypropylene chains. The oil-soluble part of the molecule may come from fatty acids, alcohols, amides or amines. More specific descriptions of such materials is also disclosed in my aforesaid U.S. Pat. No. 4,282,037, and is incorporated herein by reference.

The amount of emulsifier used will usually be between 0.05 and about 10%, of the total emulsified composition by weight. Where the latex emulsifier is different from the final gilsonite emulsion of the invention, enough emulsifier will initially need to be added to counteract the latex emulsifier. For example, if the SBR latex is of the anionic type a nonionic emulsifier should be added to stabilize or neutralize the anionic emulsifier and thereafter a cationic emulsifier may be used to make the final composition. Again, since most asphalt paving emulsions are of the cationic type and since the preferred latex residue will incorporate anionic emulsifiers, it must be compatible thereby requiring neutralization and stabilization of the composition to prevent it from setting up in the emulsion mill which could occur if the anionic emulsifier was not stabilized with a nonionic emulsifier. Such emulsion problems will be evident to those skilled in the art so that the proper amount and type of emulsifiers including if necessary a nonionic intermediate stabilizing emulsifier will be evident and may be selected as desired. It may also be desirable to substitute or incorporate surface active clay in the emulsion composition, useful as an emulsifying additive or stabilizer for the emulsion composition. If desired, a portion, or all of the emulsifying agent may comprise bentonite or montmorillonite. When used alone, the bentonite may be used in amounts of up to about 10%, preferably between about 3 and about 8%, by weight, of the emulsion. Other clays having surface active properties may also be used, for example, such as hydrated aluminum silicate clays, kaolin, kaolinite, halloysite, and pyrophyllite and the hydrated magnesium silicate clays such as serpentine, chrysotile, and talc. Although these non-bentonite clays can not be used alone as the sole emulsifier because of insufficient surface active properties, they can be combined with the previously described emulsifiers in any amounts up to about 10% of the total composition, or substituted for up to about 90% of the bentonite.

The compositions of the invention may also be used with mineral fillers such as ground limestone, calcium carbonate, kaolin, barium sulfate, feldspar, talc, and bentonite clay. Such materials may be present in amounts of up to 12:1, based on the amount of rubber present. These materials act as thickening agents to yield compositions suitable for carpet binding or backing. Carbon black, and carbon or graphite fibers are also particularly useful additives for preparing carpet treating compositions, for example, in amounts of to about 10% of the rubber solids. Thixotropic or gelling agents such as polyacrylic resins, carboxyvinyl resins, polyethylene maleic anhydrides, polysaccharides, and the like, may also be added where such properties are desirable. Amounts up to 10% by weight based on the rubber solids present are suitable. In producing carpet binding or treating compositions, larger amounts of rubber are preferred. For example gilsonite-asphalt:rubber ratios of between about 1:2 and 4:1, and more preferably between about 1:1 and 3:1 are useful. Any number of other fillers may be used in the final composition to produce specialized materials having the selected properties. In addition to use in preparing the emulsions of the invention, the base stock compositions comprising asphalt, gilsonite, and rubber latex residue blend may also be used itself, particularly as a paving composition.

By way of example, a mixture of 10 parts gilsonite and 90 parts asphalt having a penetration of 50/70 dmm was made by adding the gilsonite to the hot asphalt at 300°–350° F. Once blending was completed, an SBR latex was blended in line to the hot mixture flashing off the water with blending of the residue with the gilsonite-asphalt continued until the components were thoroughly mixed. This base stock composition contained about 1½% total rubber solids, by weight. In order to counteract the fatty acid soap emulsifier, a small amount of nonionic emulsifier was added and thereafter the mixture was blended with water containing a cationic emulsifier Armak E-5 dodecyl trimethyl ammonium chloride having a concentration of about 1% by weight of the total composition. The base stock:water phase ratio was about 2:1. The emulsion composition was found to be useful as a chip seal composition while the base stock composition itself was useful as a paving material. Other uses for such compositions as well as those compositions all within the scope of the disclosure herein will be evident to those skilled in the art.

I claim:

1. A base stock composition prepared by
   (a) substantially removing water from a rubber latex to form a residue thereof,
   (b) forming a blend of asphalt and gilsonite having an asphalt:gilsonite ratio of between about 99:1 and 5:95, by weight, respectively by mixing said asphalt and gilsonite at a temperature above about 300° F., and
   (c) mixing between about 1% and about 50% of said rubber latex residue based on said blend with said asphalt and gilsonite blend to form said base stock having substantially no water therein.

2. A base stock composition prepared by
   (a) heating a mixture of asphalt and gilsonite having as asphalt:gilsonite ratio of between about 99:1 and 5:95, by weight, respectively at a temperature sufficient to melt said gilsonite, said temperature being above about 300° F.,
   (b) adding between about 1 and about 50% by weight, based on said mixture of asphalt and gilsonite of rubber latex to said heated asphalt and gilsonite mixture and flashing off substantially all of the water of said rubber latex to form a rubber latex residue, and
   (c) mixing said asphalt, gilsonite and rubber latex residue to form said base stock composition having substantially no water therein.

3. A base stock composition having substantially no water therein and comprising a blend of asphalt, gilsonite and rubber having an asphalt:gilsonite ratio of between about 99:1 and 5:95, by weight, respectively and having between about 1 and about 50% rubber based on the combined asphalt and gilsonite, by weight.

4. The composition of claim 3 wherein said rubber is styrene-butadiene rubber.

5. The composition of claim 3 including up to 12:1 parts mineral filler based on the amount of rubber, by weight.

6. The composition of claim 3 including up to 10% by weight of the rubber of a material selected from the group consisting of carbon black, carbon fibers or graphite fibers.

7. The composition of claim 3 wherein the ratio of gilsonite-asphalt:rubber is between about 1:1 and 3:1, by weight, respectively.

* * * * *